Patented Jan. 13, 1925.

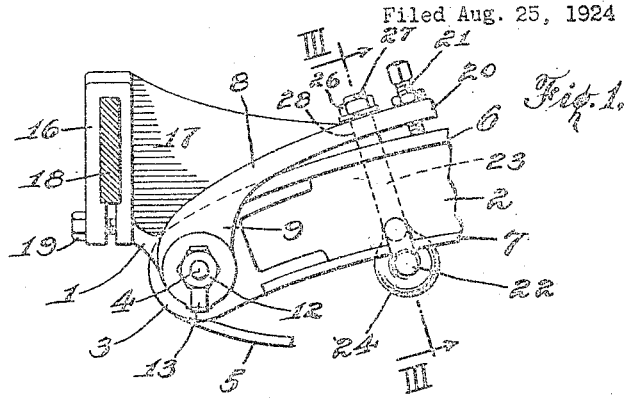
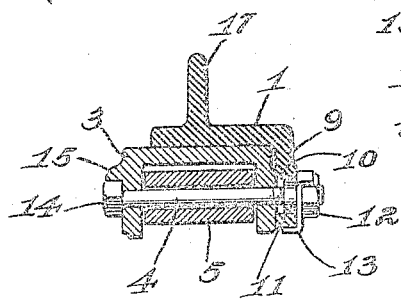
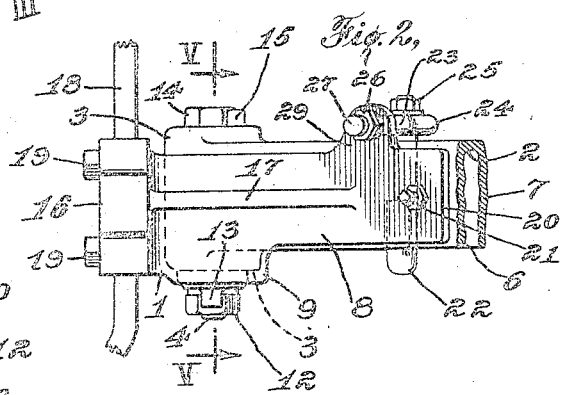
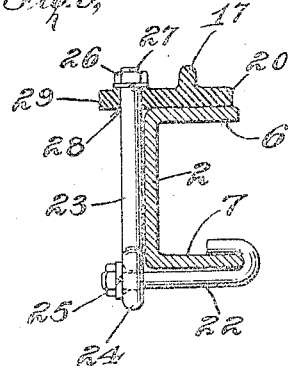
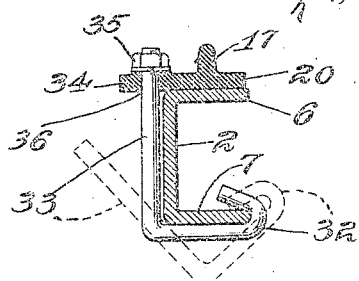

1,522,512

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed August 25, 1924. Serial No. 734,065.

To all whom it may concern:

Be it known that I, OSCAR H. GOETZ, a citizen of the United States, residing at Bridgeport, in the county of Fairfield, State of Connecticut, United States of America, have invented certain new and useful Improvements in Automobile Bumper Brackets, of which the following, taken in connection with the accompanying drawing, is a specification.

This invention relates to automobile bumper brackets, and is of special utility when embodied in the structure of brackets to be mounted pivotally upon the horns or forward ends of longitudinal automobile frame members, although I contemplate the utilization of my improvements in any field for which they are adapted by their nature.

An object of this invention is to provide a bracket, preferably formed of malleable metal to permit its ready conformation to the lines of the car, in course of manufacture, and said bracket comprising a bumper clamp preferably formed integrally with an attaching lug apertured to fit upon the conventional spring-bolt at the inside of the front end or horn of the automobile frame, where the aforesaid spring bolt usually has an easily removable nut, so that the bracket fitting can be readily applied thereto; and a cognate object is to provide the bracket with a tail-piece having an anchor, situated at the opposite or outer side of the horn to avoid interference with the splash pans and fenders which often prevent the desirable conventional use of U-bolts embracing the horn, on many car fronts as now constructed.

In carrying the above objects into effect I have devised a non-interfering anchor taking the form of a hook-bolt to be engaged with the lower inside flange of the conventional channel bar which ordinarily forms part of the horn structure, and this hook-bolt is fitted snugly to the flange out of the way of the aforesaid splash pans or fenders, and having a connection with the tail-piece of the bracket constituted by an elongated integral shank or extension of the hook-bolt, or by an eye-bolt constituting such an extension.

In each instance the connecting part passes through a hole in the tail-piece, or in a lug formed on the outer margin thereof, and is fitted with a nut by which the hook-bolt extension can be tightened to draw the tail-piece of the bracket snugly against the horn, or against an adjustable stop carried by the tail-piece of the bracket.

Referring to the drawings:

Figure 1 is a fragmentary side view of one form of the bracket shown attached to an automobile frame.

Figure 2 is a top view of the form shown in Figure 1.

Figure 3 is a view in section on the line III—III of Figure 1.

Figure 4 is a similar view of a modification.

Figure 5 is a view in section on the line V—V of Figure 2.

In the illustrated embodiment, a bracket 1 is shown in connection with the horn or forward end 2 of a conventional type of automobile frame, the horn having an eye 3 in which is journalled the spring-bolt 4 connected with the spring 5 in the usual manner, and the horn 2 is shown as formed by a channel bar having an upper flange 6 and a lower flange 7. In accordance with the invetion the bracket 1 comprises a body-portion 8 to overlie the upper flange 6 of the horn and provided with a depending lug 9 preferably formed integrally therewith, having an aperture 10 transfixed by the spring-bolt 4 and sufficiently large in diameter to receive the portion 11 of a shoulder-nut 12, which preferably has a lock washer 13, while the head 14 of the bolt is held from rotation by the shoulder 15 of the eye 3, in well-known fashion.

A clamp 16 is supported by the horizontal web 1 and the vertical web 17 in suitable position to receive and support the bumper bar 18, clamped therein by the screws 19, the bumper preferably being presented forwardly of the horn, and in general the lines of the bracket conform to those of the car, the bracket being preferably cast or forged from malleable metal. The tail-piece 20 is preferably provided with a set-screw 21 to regulate the angular relation of the bracket and bumper to the horn, and suitable means are provided to hold the bracket and bumper firmly in such adjusted position.

As a convenient form of such a fastening device I have provided a hook-bolt 22 to be engaged with the inner margin of the lower flange 7 of the horn channel-bar 2, at a region where there will be no interference by splash pans or fenders, and this hook-bolt has a connection 23 with the tail-piece 20 at the outer side of the horn, one form of such connection taking the form of an eye-bolt having its shank extended through a hole 28 in the lug 29 of the tail-piece 20, and whose eye 24 is transfixed by the shank of hook-bolt 22, which can be tightened laterally by a nut 25, while the tail-piece can be drawn toward the upper channel bar flange 6 by tightening a nut 26 upon the upper threaded end 27 of the eye-bolt or other connecting part 23 until this adjustive movement is stopped by the set-screw 21, or by engagement of the tail-piece 20 with the flange 6.

As a modification of the connector for the hook-bolt I have shown in Figure 4 a hook-bolt 32 in which the connector 33 is formed as an integral extension of the hook-bolt, extending upward alongside the horn 2 and transfixing the lug 34 of the bracket tail-piece 20, the nut 35 thereon serving to tighten the hook-bolt 32 both laterally and upwardly when it has been inserted in the hole 36 of lug 34 after the original assembly in dotted line position.

Having thus described my invention, I claim:

1. An automobile bumper supporting bracket of the type adapted to be clamped on the upper surface of the frame horn, said bracket comprising a body portion to overlie said horn and having a depending apertured lug to be fitted upon the spring bolt at the inner side of the horn, said bracket having also a forwardly extending bumper clamp, and a tail-piece; and in combination therewith a hook-bolt having a hook to underlie said horn and be engaged with the lower inside margin thereof, said hook-bolt having a connection with said tail-piece at the outer side of said horn, and having also a nut serving to draw said hook laterally against said inner margin, and serving also to draw said tail-piece toward the upper surface of the horn.

2. An automobile bumper supporting bracket of the type adapted to be clamped on the upper surface of the frame horn, said bracket comprising a body portion to overlie said horn and having a depending apertured lug to be fitted upon the spring bolt at the inner side of the horn, said bracket having also a forwardly extending bumper clamp, and a tail-piece, and in combination therewith a hook-bolt having a hook to underlie said horn and be engaged with the lower inside flange thereof, said hook-bolt having a connection with said tail-piece at the outer side of said horn, and serving to draw said hook laterally against said inner margin, and serving to draw said tail-piece toward the upper surface of the horn; and a set-screw to regulate the angular relation of said bracket to said horn, in opposition to the draft exerted by said bolt.

3. An automobile bumper supporting bracket of the type adapted to be clamped on the upper surface of the frame horn, said bracket comprising a body portion to overlie said horn and having a depending apertured lug to be fitted upon the spring bolt at the inner side of the horn, said bracket having also a forwardly extending bumper clamp and a tail-piece, and in combination therewith a hook-bolt having a hook to underlie said horn and be engaged with the lower inside margin thereof, said hook-bolt having a connection with said tail-piece at the outer side of said horn, in the form of a separately formed eye-bolt, said hook-bolt and eye-bolt having each a nut, the nut on the hook-bolt serving to draw said hook laterally against said inner margin, and the nut on the eye-bolt serving to draw said tail-piece toward the upper surface of the horn.

4. An automobile bumper supporting bracket of the type adapted to be clamped on the upper surface of the frame horn, said bracket comprising a body portion to overlie said horn and having a depending apertured lug to be fitted upon the spring bolt at the inner side of the horn, said bracket having also a forwardly extending bumper clamp and a tail-piece, and in combination therewith a hook-bolt having a hook to underlie said horn and be engaged with the lower inside margin thereof, said hook-bolt having a connection with said tail-piece at the outer side of said horn, in the form of a separately formed eye-bolt, said hook-bolt and eye-bolt having each a nut, the nut on the hook-bolt serving to draw said hook laterally against said inner margin, and the nut on the eye-bolt serving to draw said tail-piece toward the upper surface of the horn; and a set-screw to regulate the angular relation of said bracket to said horn, in opposition to the draft exerted by said bolts.

In witness whereof, I have signed this specification.

OSCAR H. GOETZ.